(12) United States Patent
Tellis et al.

(10) Patent No.: US 8,744,896 B2
(45) Date of Patent: Jun. 3, 2014

(54) EXTRACTING DIMENSIONS OF QUALITY FROM ONLINE USER-GENERATED CONTENT

(75) Inventors: Gerard J. Tellis, Hacienda Heights, CA (US); Seshadri Tirunillai, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 0 days.

(21) Appl. No.: 13/495,938

(22) Filed: Jun. 13, 2012

(65) Prior Publication Data

US 2012/0316917 A1 Dec. 13, 2012

Related U.S. Application Data

(60) Provisional application No. 61/496,469, filed on Jun. 13, 2011.

(51) Int. Cl.
*G06Q 10/00* (2012.01)
(52) U.S. Cl.
USPC .................................................. 705/7.29
(58) Field of Classification Search
USPC .................................................. 705/7.29
See application file for complete search history.

(56) References Cited

U.S. PATENT DOCUMENTS

2003/0055843 A1* 3/2003 Chiu .......................... 707/104.1
2008/0294498 A1* 11/2008 Adrien et al. ................. 705/10

OTHER PUBLICATIONS

Aaker, D. et al. 1994. The financial information content of perceived quality. Journal of marketing research, vol. 31, No. 2, pp. 191-201.
Archak, N. et al. 2011. Deriving the pricing power of product features by mining consumer reviews. Management Science, vol. 57, No. 8, pp. 1485-1509.
Blei, D. et al. 2003. Latent dirichlet allocation. The Journal of Machine Learning Research, vol. 3, pp. 993-1022.
Blei, D. et al. 2006. Dynamic topic models. ACM, pp. 113-120.
Braun, M. et al. 2011. Scalable Inference of Customer Similarities from Interactions Data Using Dirichlet Processes. Marketing Science, vol. 30, No. 3, pp. 513-531.
Buntine, W. et al. 2006. Subspace, Latent Structure and Feature Selection, Springer, Discrete component analysis, pp. 1-33.
Chevalier, J. et al. 2006. The effect of word of mouth online: Online book reviews. Journal of Marketing Research, vol. 43, No. 3, pp. 345-354.
Cuadras, C. et al. 2006. A comparison of methods for analyzing contingency tables. Communications in Statistics: Simulation and Computation, vol. 35, pp. 447-459.

(Continued)

*Primary Examiner* — Romain Jeanty
(74) *Attorney, Agent, or Firm* — McDermott Will & Emery LLP

(57) ABSTRACT

The quality of a product may be an important driver of consumer satisfaction, competition, and long-term brand success. Identifying the right dimensions of product quality may be central to devising segmentation and positioning strategies, rankings brands, creating advertising content, improving current products, or designing new products. User-generated content, such as product reviews, may identify quality. Data in product reviews is analyzed across fifteen firms in five markets over four years to extract the dimensions of experienced quality using Latent Dirichlet Allocation. The face, external, and predictive validity of these dimensions is explored. Results suggest that a few dimensions may be enough to capture experienced quality, have good correspondence to other metrics of quality, and serve as reasonably good predictors of earnings and stock market returns. Dynamic analysis may enable tracking the importance of dimensions and of competitive brand positions on those dimensions over time.

19 Claims, 11 Drawing Sheets

(56) References Cited

OTHER PUBLICATIONS

Decker, R. et al. 2010. Estimating aggregate consumer preferences from online product reviews, International Journal of Research in Marketing, vol. 27, pp. 293-307.
Dellarocas, C. et al. 2007. Exploring the value of online product reviews in forecasting sales: The case of motion pictures. Journal of Interactive Marketing, vol. 21, No. 4, pp. 23-45.
Desarbo, W. et al. 1992. Latent class metric conjoint analysis. Marketing Letters, vol. 3, No. 3, pp. 273-288.
Desarbo, W. et al. 1997. A parametric multidimensional unfolding procedure for incomplete nonmetric preference/choice set data in marketing research. Journal of Marketing Research, vol. 34, No. 4, pp. 499-516.
Desarbo, W. et al. 2008. A clusterwise bilinear multidimensional scaling methodology for simultaneous segmentation and positioning analyses. Journal of Marketing Research, vol. 45, No. 3, 280-292.
Feldman, R. et al. 2010. Mine Your Own Business: Market Structure Surveillance through Text Mining. 50 pages, Jan. 2010. Marketing Science.
Fleiss, J. 1971. Measuring nominal scale agreement among many raters. Psychological Bulletin, vol. 76, No. 5, p. 378-382.
Ghose, A. et al. 2012. Designing Ranking Systems for Hotels on Travel Search Engines by Mining User-Generated and Crowdsourced Content, Marketing Science, vol. 31, No. 3, pp. 493-520, May-Jun. 2012.
Godes, D. et al. 2004. Using online conversations to study word-of-mouth communication. Marketing Science, pp. 545-560.
Griffiths, T. et al. 2004. Finding scientific topics. Proceedings of the National Academy of Sciences of the United States of America, vol. 101 (Suppl. 1), pp. 5228-5235.
Grimmer, J. 2010. A Bayesian hierarchical topic model for political texts: Measuring expressed agendas in Senate press releases. Political Analysis, vol. 18, No. 1, pp. 1-35.
Jo, Y. et al. 2011. Aspect and sentiment unification model for online review analysis. Proceedings of the Fourth ACM International Conference on Web Search and Data Mining (WSDM '11), Feb. 9-12, 2011, Hong Kong, China, pp. 815-824.
Kamakura, W. et al. 1996. Modeling preference and structural heterogeneity in consumer choice. Marketing Science, vol. 15, No. 2, pp. 152-172.
Kim, S. et al. 2006. Extracting opinions, opinion holders, and topics expressed in online news media text. Proceedings of the COLING conference, Geneva, 2004, Association for Computational Linguistics, pp. 1-8.
Landis, J. et al. 1977. The measurement of observer agreement for categorical data. Biometrics, vol. 33, No. 1, pp. 159-174, Mar. 1977.
Lee, T. et al. 2011. Automated Marketing Research Using Online Customer Reviews. Journal of Marketing Research, vol. 48, No. 5, pp. 881-894.
Luo, X. 2009. Quantifying the long-term impact of negative word of mouth on cash flows and stock prices. Marketing Science, vol. 28, No. 1, pp. 148-165.
Mitchell, M. et al. 1999. Managerial decisions and long-term stock price performance. Journal of Business, pp. 287-329 (First draft 1997, current draft 1999).
Mitra, D. et al. 2006. How does objective quality affect perceived quality? Short-term effects, long-term effects, and asymmetries. Marketing Science, vol. 25, No. 3, pp. 230-247, May-Jun. 2006.
Netzer, O. et al. 2012. Mine your own business: Market-structure surveillance through text mining. Marketing Science, vol. 31, No. 3, pp. 521-543.
Onishi, H. et al. 2012. Marketing activity, blogging and sales. International Journal of Research in Marketing, 44 pages. (Jun. 2008; version submitted Jun. 2011.).
Porter, M. 1997. An algorithm for suffix stripping. Morgan Kaufmann Publishers Inc., pp. 313-316.
Rao, C. 1995. Use of Hellinger distance in graphical displays. Multivariate statistics and matrices in statistics. Leiden (Netherlands): Brill Academic Publisher, pp. 143-161.
Rust, R. et al. 1995. Return on quality (ROQ): making service quality financially accountable. The Journal of Marketing, vol. 59, No. 2, pp. 58-70.
Sonnier, G. et al. 2011. A Dynamic Model of the Effect of Online Communications on Firm Sales. Marketing Science, vol. 30, No. 4, pp. 702-716, Jul.-Aug. 2011 (mksc—1110).
Srivastava, R. et al. 1999. Marketing, business processes, and shareholder value: an organizationally embedded view of marketing activities and the discipline of marketing. The Journal of Marketing, vol. 63, pp. 168-179.
Tellis, G. et al. 1987. Competitive price and quality under asymmetric information. Marketing Science, vol. 6, No. 3, pp. 240-253.
Tellis, G. et al. 2007. The value of quality. Marketing Science, vol. 26, No. 6, pp. 758-773.
Tetlock, P. 2007. Giving content to investor sentiment: The role of media in the stock market. The Journal of Finance, vol. 62, No. 3, pp. 1139-1168.
Tetlock, P. et al. 2008. More than words: quantifying language to measure firms' fundamentals. The Journal of Finance, vol. 63, No. 3, pp. 1437-1467.
Tirunillai, S. et al. 2012. Does Chatter Really Matter? Dynamics of User-Generated Content and Stock Performance. Marketing Science, vol. 31, No. 2, pp. 198-215.
Turney, P. et al. 2003. Measuring praise and criticism: Inference of semantic orientation from association. ACM Transactions on Information Systems (TOIS), vol. 21, No. 4, pp. 314-346, Oct. 4, 2003.
Dynamic Brand Mapping of HP Versus Dell, paper, uploaded on Mar. 12, 2012, selected screen shots. (Video available for download at http://www.youtube.com/watch?v=DV1Zq3290NY.).

\* cited by examiner

| Instability (Negative) | Portability (Positive) | (Signal) Receptivity (Positive) | Compatibility (Positive) | (Layout) Discomfort (Negative) | Secondary Features (Positive) |
|---|---|---|---|---|---|
| Unstable | smooth | dependable | universal | Cramp | feature |
| error | handy | reception | expandable | bug | app |
| crash | portable | sharp | supported | layout | card |
| freeze | Small | quick | compatible | finger | camera |
| reboot | compact | crisp | accessible | heavy | Wi-Fi |

*FIG. 3*

Dimensions Extracted for Cellphone Market

| Portability (Positive) | (Signal) Receptivity (Positive) | Instability (Negative) | Exhaustible (Battery) (Negative) | (Layout) Discomfort (Negative) | Secondary Features (Positive) |
|---|---|---|---|---|---|
| portable | dependable | unstable | Drain | cramp | feature |
| expandable | reception | error | Power | thick | app |
| handy | sharp | crash | Poor | layout | card |
| small | quick | freeze | exhaust | discomfort | camera |
| compact | crisp | reboot | excess | heavy | Wi-Fi |

*FIG. 4A*

Dimensions Extracted for Computer Market

| Performance (positive) | Ease of Use (positive) | Secondary Features (positive) | Service (positive) | Un-reliability (negative) | Non-durable (negative) |
|---|---|---|---|---|---|
| fast | flexible | sound | support | died | flimsy |
| power | screen | resolution | technician | replace | break |
| speed | large | specs | warranty | flicker | wear |
| perform | ease | Blu-ray | resolved | static | crack |
| capacity | awesome | touchscreen | quick | restart | fragile |

*FIG. 4B*

Dimensions Extracted for Data Storage Market

| Instability (negative) | Inefficiency (negative) | Style (positive) | Compatibility (positive) | Design - Disc Speed (positive) |
|---|---|---|---|---|
| crash | heat | variety | compact | Latency |
| fail | dry | aesthetic | sync | Access |
| unreliable | construct | style | compatible | Read |
| unstable | consume | color | flexible | Fast |
| recover | protect | line | software | speed |

FIG. 4C

Dimensions Extracted for Toys Market

| Durability (positive) | Design (positive) | Aesthetics (positive) | Safety (negative) | Difficulty in Use (negative) |
|---|---|---|---|---|
| sturdy | construct | looks | hazard | heavy |
| durable | design | cute | choking | unwieldy |
| lasted | intricate | cosmetic | | clumsy |

FIG. 4D

Dimensions Extracted for Footwear Market

| Comfort (positive) | Design (positive) | Misfit (negative) | Aesthetic (positive) | Durability (positive) |
|---|---|---|---|---|
| comfort | cushion | narrow | style | lasting |
| lightweight | speed | fit | look | sturdy |
| smooth | padding | sizing | natural | resistant |
| | airy | tight | | |

FIG. 4E

| Market | (Fleiss) Kappa Coefficient |
|---|---|
| Cell phone | 60% |
| Computer | 62% |
| Data Storage | 57% |
| Toys | 53% |
| Footwear | 61% |

FIG. 9

| Dimension | Automated Method | Consumer Reports |
|---|---|---|
| Ease of Use (e.g. Voice commands, navigation) | √ | √ |
| Performance (Voice clarity and sensitivity) | √ | √ |
| Messaging | √ | x |
| Exhaustibility (Battery) | √ | x |
| Layout Discomfort | √ | x |
| Secondary Features (e.g. Camera, Music Player) | √ | √ |
| Compatibility (e.g. Bluetooth, headphones) | √ | √ |

FIG. 10A

| Dimension | Automated Analysis | Consumer Reports |
|---|---|---|
| Performance | √ | √ |
| Ease of Use | √ | √ |
| Secondary Features (Speaker quality, Wi-Fi) | √ | √ |
| Compatibility (Wi-Fi, Memory Card Reader, 64 Bit OS etc.) | √ | √ |
| Service (e.g. Technical support, After sales, warranty issues) | √ | x |
| Un-reliability (e.g. Hard Disk Failure) | √ | x |
| Non-durable (e.g. breakage of parts) | √ | x |
| Portability (size, weight) | √ | x |
| Ergonomics | √ | √ |

FIG. 10B

| Dimension | Automated Method | Consumer Reports |
|---|---|---|
| Weight | √ | √ |
| Cushioning | √ | x |
| Stability | √ | √ |
| Fit | √ | √ |
| Flexibility | √ | √ |
| Breathability | √ | √ |
| Design | √ | √ |
| Durability | √ | x |
| Aesthetics | √ | x |

FIG. 10C

| Market | Jaccard Coefficient |
|---|---|
| Cell phone | 0.65 |
| Computer | 0.72 |
| Footwear | 0.81 |

FIG. 11

| Market | Correlation |
|---|---|
| Cell phone | 0.74 |
| Computer | 0.81 |
| Footwear | 0.61 |

| Cellphone | | Computers | | Footwear | | Toys | | Data Storage | |
|---|---|---|---|---|---|---|---|---|---|
| Call Performance | 0.0137 | Cameras | 0.038 | Comfort | 0.031 | Aesthetics | 0.038 | Durability (negative) | 0.0137 |
| Secondary Features | 0.0031 | Cameras Performance | 0.0008 | Aesthetics | 0.0047 | Design | 0.0038 | Design | 0.0023 |
| Ease of Use | 0.0024 | Durability (negative) | 0.031 | Fitness | 0.0043 | Durability (negative) | 0.0034 | Aesthetics | 0.0044 |
| Discomfort (Ingress) (negative) | 0.0008 | Ease of Use | 0.0004 | Design | 0.0018 | Ease of Use | 0.0048 | Compatibility | 0.0015 |
| Data Connectivity (negative) | 0.0003 | Sec. Features | 0.0005 | Durability | 0.031 | Durability | 0.0027 | Speed (negative) | 0.0049 |
| Aesthetic Appearance (negative) | 0.0017 | Non-Availability | 0.0021 | | | | | | |
| Energy In-efficiency (negative) | 0.0005 | Graphical Performance | 0.0028 | | | | | | |
| | | Comfort (Ingress) (negative) | | | | | | | |

*FIG. 14*

EXTRACTING DIMENSIONS OF QUALITY FROM ONLINE USER-GENERATED CONTENT

CROSS-REFERENCE TO RELATED APPLICATION

This application is based upon and claims priority to U.S. provisional patent application 61/496,469, entitled "Analyzing Online User-Generated Content to Derive Latent Dimensions of Perceived Quality," filed Jun. 13, 2011. The entire content of this application is incorporated herein by reference.

BACKGROUND

1. Technical Field

This disclosure relates to the extraction of information about the quality of products and services from online user-generated content.

2. Description of Related Art

The quality of a product or service (hereinafter just "product") may be one of the important determinants of the performance and long-term success of a brand. Quality may drive customer preferences, market share, customer satisfaction, brand loyalty, price, perceived quality, and ultimately firm value.

All these variables may be affected through the construct of perceived quality. Managers and researchers may seek to obtain measures of perceived quality through surveys or interviews of customers. These may be based on limited samples that are administered periodically.

Customers are also increasingly sharing their opinions about products and services on various online platforms, such as product reviews, bulletin boards, and social network websites. These online expressions of customers in media of this type are referred to herein as user-generated content (UGC).

UGC (particularly in the form of product reviews) may be influential in determining demand, sales, and financial performance. As compared to surveys of customers, UGC may be spontaneous, passionate, widely available, low in cost, easily accessible, temporally disaggregate (days, hours, minutes), and live. This type of content is also growing rapidly and can be easier to administer and monitor as compared to surveys. Also, an analysis of UGC may be based on hundreds of thousands of customer contributions to online forums. As such, UGC may represent the "wisdom of the crowds." Thus, UGC can be a very useful source of information about the perceived quality of products and services. Almost all of this UGC may be based on consumer experiences with the product and thus is referred to herein as "experienced quality" or just "quality."

Extracting accurate and useful information about product or service quality from a large database of UGC, however, can be difficult and time consuming. It can be particularly challenging to do this on an automated basis using computer software.

SUMMARY

Computer software may create a brand map by: converting online user-generated content concerning various brands of a product or service into structured data that has a structured format that is appropriate for machine analysis; performing a statistical analysis on the structured data that yields statistics about the quality of the product or service; deriving multiple dimensions concerning the quality of the product or service from the statistics; labeling the dimensions with entropy statistics; and generating a brand map of the relative market positions of the brands based on the statistics and the multiple dimensions.

The user-generated content may be in the form of comments about the product or service in unstructured text. The unstructured text may include consumer reviews of the product or service.

The statistical analysis may include dimension reduction. The dimension reduction may include a latent Dirichlet allocation and/or a principle component analysis.

The one or a combination of the statistics may represent a dimension of quality concerning the product or service.

The user-generated content may include reviews of the product or service.

At least one of the dimensions may include a characteristic of the product or service that is hidden or latent in a plurality of the reviews.

At least one of the dimensions may concern a characteristic of the product or service. The characteristic may be the reliability, durability, or ease of use of the product or service.

At least one of the dimensions may be associated with a valence that is positive or negative.

The brand map may set forth positions of the brands on a latent space that may perceived by customers. The positions of the brands may be relative to each other depending on evaluation of the brands by customers.

The brand map may be used to predict stock market performance of a company associated with one of the brands.

The software may be used to get feedback from customers about the product or services The software may determine changes to the dimensions and brand map as a function of time.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 illustrates an example of the dimensions extracted for Motorola in the cell phone market during November, 2008.

FIGS. 4A-4E illustrate examples of extracted dimensions during the fourth quarter of 2008 for various markets, specifically cell phones (FIG. 4A), computers (FIG. 4B), data storage (FIG. 4C), toys (FIG. 4D), and footwear (FIG. 4E).

FIG. 8A illustrates the probability mass associated with the dimension. FIG. 8B illustrates the frequency of occurrence of the dimension across the reviews in a given week.

FIG. 9 illustrates percentages of agreement between automated analysis and human raters for the cell phone, computer, data storage, toys, and footwear markets.

FIG. 10A-C illustrate comparisons between an automated method of analysis and results in Consumer Reports for the cell phone market (FIG. 10A), computer market (FIG. 10B), and footwear market (FIG. 10C).

FIG. 11 illustrates degree of overlap of a set of dimensions by Consumer Reports and an automated analysis.

FIG. 12 illustrates a mean rank order correlation between Consumer Reports ratings and automated analysis across firms in the markets.

FIG. 13 illustrates prediction of stock earnings using dimensions of quality.

FIG. 14 illustrates prediction of stock performance using dimensions of quality.

DETAILED DESCRIPTION OF ILLUSTRATIVE EMBODIMENTS

Figure 1:
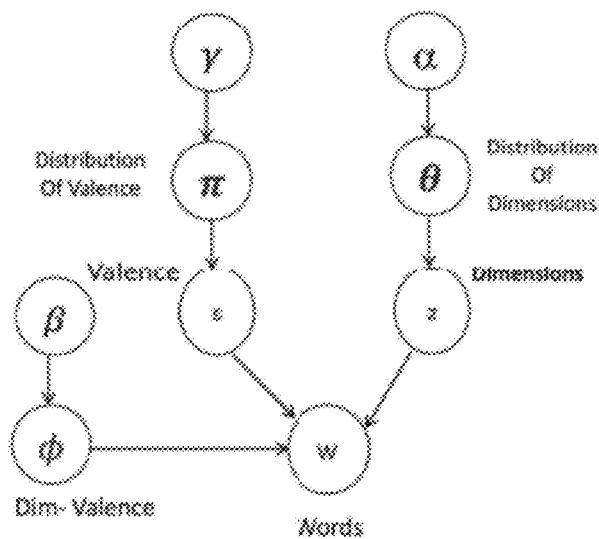
FIG. 1 illustrates an example of the hierarchy of how parameters may relate words to dimensions and valence.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A parsimonious set of latent dimensions of quality concerning a product may be extracted from user-generated content (UGC), such online product reviews, bulletin boards, blogs, forums, and social network websites. Latent dimensions are variables of quality that may not be explicitly mentioned by consumers. They can capture or represent a large number of physical attributes of a product, such as the speed of a computer processor, the weight of a laptop, or the brightness of a computer screen, as well as non-physical attributes, such as the "cheap plastic feel" of a laptop.

The valence expressed in UGC may be extracted using automated (non-human) data processing techniques. Valence is the expression of positive versus negative performance on a dimension or attribute or quality. Valence is also sometimes called sentiment or polarity. Valence may need to be extracted within the context of the expression. For example, "small" could be an expression of a positive quality of a cell phone, but a negative quality of a computer display.

The dynamics of experienced quality over time may be captured enabling dynamic brand mapping. Such dynamics could be obtained at a daily or hourly level. However, due to sparseness at the brand level in the early years of the compiled data, dynamics may be presented only at the weekly, monthly or yearly level. As UGC continues to grow, a more disaggregate analysis may be provided.

The impact of extracted dimensions of quality on financial performance may be measured by earnings and stock market returns.

A set of methods has been demonstrated on a relatively broad sample of five markets and sixteen different brands. The results of these demonstrations are discussed below.

All parts of the analysis of UGC may be performed automatically with computer software, with little human intervention, even up to the labeling of dimensions. These automated methods are sometimes referred to as unsupervised techniques in statistics and machine learning in literature. Text mining is another term that is used.

There can be several advantages to this automated mining of UGC. Vast quantities of data may be processed with minimal bias or errors from rater tedium. The models may "learn" or discover the dimensions and the valence from sample data. Thus, latent dimensions need not be known in advance.

Dimensions of quality in a product category may represent the dimensions of competition within a market. As such, these dimensions of quality may be used for dynamic analysis of brand positioning, segmentation, and new product design, as well as for designing advertising content, measuring customer satisfaction, and assessing brand equity. The value of the latent dimensions may be shown in one of these applications, understanding dynamic brand positions over time.

The next three sections of this specification describe methods, validation, results, and brand mapping. The section thereafter summarizes findings, discusses implications, and lists potential limitations.

Method

Described below are methods of sampling, textual analysis, dimension and valence extraction, and dimension labeling.

Sampling

Data was collected without the help of any market research firm or syndicated data provider. Firms, brands, time periods, and markets were selected according to multiple criteria, as explained below.

Markets were selected that had rich data on UGC, such as high-tech products and popular consumer durables that were available over an extended period of time. The product categories that were chosen accounted for a significant fraction of firm sales. (Diversified firms such as P&G or J&J were not included, as the chatter about individual products for these firms may not provide a single clear signal about the quality perception across all their products.) Since the dimensions of quality may be validated using the financial performance of the firm, both in terms of earnings and stock market performance; firms were sampled that were listed on one of the U.S. stock exchanges (NYSE, NASDAQ or AMEX) and had not lost their identities (e.g., mergers or acquisitions) during the time period of the data. The following five markets (and brands) were included for the final analysis: personal computing (Hewlett Packard Company and Dell, Inc.), cellular phones (Motorola, Inc. and Nokia Corporation, Research In Motion Limited, and Palm, Inc.), footwear (Skechers USA, Inc., Timberland Company, and Nike, Inc.), toys (Mattel, Inc., Hasbro, Inc. and Leap Frog, Inc.), and data storage (Seagate Technology, Western Digital Corporation and SanDisk, Inc.).

The period between June 2005 and January 2010 was chosen for analysis. UGC data was found to be sparse before this period. The data was collected at a daily level across the brands in the sample. However, due to sparse data in some periods, data was aggregated to the daily level to relate to stock prices, to the weekly level of analysis of dynamics, and to higher levels when validating with external data at higher levels of aggregation.

Consumers generate online content in a variety formats, such as text (e.g., blogs and product reviews). Product reviews were selected for analysis for the following reason.

Consumer reviews are tightly focused on product evaluations. These were unlike other forms, such as blogs, forums, and bulletin boards, where the conversations can digress substantially from product-related issues, which can This greatly dilute the signal-to-noise ratio. Three popular websites were used: Amazon.com, Epinions.com (a service of Shopping.com, Inc., an eBay company), and Yahoo Shopping (a service of Yahoo.com that allowed access to reviews from other affiliate sites). These sources may be among the most popular websites for consumer reviews and may have a very high reach and acceptance among consumers, as reflected in the number of unique visitors and the number of their years of existence.

Automated software data processing techniques were utilized for data collection and analysis. For sites that allowed access to reviews data through an application programming interface (API) (e.g., Amazon Web Services and Yahoo Shopping), that approach was used. In the case of Epinions.com, where no web service is available, scripts were used to collect data from the site periodically. Each review was treated as an independent document for analysis. The sample contained about 347,628 reviews between June 2005 and January 2010. Financial data was obtained from CRSP (Center for Research in Security Prices) and I/B/E/S databases (accessed through Wharton Research Data Services).

Text Analysis

Analysis of the text in the reviews may be difficult for numerous reasons. There may be no structure in the text. Most reviews written by consumers tend to be casual in the usage of English grammar and words. The textual content in these reviews may need to be cleansed to remove words that are not informative about the products or its dimensions of quality. A lot of words may have to be transformed to a form that enables them to be manipulated numerically. Steps involved in preparing the text for the statistical analysis are now summarized.

The starting point for the pre-processing step may be cleaning and standardizing the textual data for analysis. These steps may be implemented, for example, using the modules in Natural Language Toolkit (NLTK). Non-English characters and words may then be eliminated (such as HTML tags, URLs, telephone numbers, and punctuation) that do not usually have information content about the product or the dimensions of quality of interest. The entire review may be eliminated if more than a large percentage (e.g., 80%) of the words are not in English. (Doing so, about three percent of the sample of reviews were eliminated.) Pronouns may be replaced with the corresponding nouns, especially of the products or brands (referred to as "anaphoric resolution"). The reviews may then be broken into individual sentences (usually by the presence of some character signifying the end of sentences such as ".", "?", "!", or a new line character). Part of Speech (POS) tagging may then be applied to each of the sentences to retain only words that are adjectives, nouns, and adverbs, i.e., words that have information about the product or the product quality. Since, these sentences are in a tokenized (running text converted to individual words or phrases) format, common negatives of words (e.g., not, hardly, no) may be replaced by prefixing a "not" to the token word that follows. Words may also be "stemmed" (i.e., converted to the root form, e.g., like for likable, liked, liking, etc.) using, for example, Porter's Stemming algorithm (Porter, M., 1997, "An algorithm for suffix stripping," Morgan Kaufmann Publishers Inc., pp. 313-316). All stop words (e.g., the, and, when, is, at, which, on, in) may be removed. Although these may be used for connection and grammar, they may not be required for meaning. Al the words that do not occur in at least a small percentage (e.g., 2%) of the product reviews in a given market may also be removed. This may ensure that outlier words that are rarely used by the consumers in expressing their opinions about products do not influence the results. More details about one approach for implementing these steps are described in Lee, T., & BradLow, E., 2011, "Automated Marketing Research Using Online Customer Reviews," Journal of Marketing Research, 48(5), 881-894; Feldman, Goldenberg and Netzer 2009, Oded Netzer, Ronen Feldman, Jacob Goldenberg, Moshe Fresko, Mine Your Own Business: Market-Structure Surveillance Through Text Mining, *Marketing Science* (2012); and Archak, N., Ghose, A., & Ipeirotis, P., 2011, "Deriving the pricing power of product features by mining consumer reviews," Management Science, 57(8), 1485-1509).

Each individual review may be treated as a separate document. The steps described above may be run across all of the reviews for a given brand in a given market. This may become the "corpus" of text used for further statistical analysis.

Dimension and Valence Extraction

Dimension extraction may take place in six stages: challenges, intuition, specification, estimation, and labeling.

—Challenges

The problem of extracting dimensions of quality from consumer reviews on the web may be analogous to traditional factor (principal component) analysis, but may present unique challenges. A large number of consumers may each use their own words to describe quality with its physical and non-physical attributes. While some words may be common, the corpus of words may be very large, numbering in the thousands, highly skewed, exhibiting characteristics of a long tail.

For example, consumers may express opinions on only those dimensions that are salient to their experience. So each review may not discuss all the dimensions that are salient for all consumers. As a result, the matrix of reviews that results from the structuring of the reviews (each row containing words from a single review in its columns) used for dimension extraction may be very large (e.g., 2,000×1,000), yet extremely sparse (containing mostly 0s).

Traditional factor analysis may not work reliably on such high-dimensional sparse matrices due to problems with convergence, parameter stability, and over-fitting, which the current data may violate.

The valence and adjectives may be context specific. For example, a word such as "small" could be evaluated positively in the context of a laptop's size, but it could have a negative connotation when used in context of the laptop's memory capacity. Thus, standard lexicons of positive and negative terms developed across markets may not be applicable for each market.

Recent advances in probability models and Bayesian inference techniques may be exploited to simultaneously resolve these two challenges and extract the dimensions of quality. In particular, a class of techniques known as the Probabilistic topic models may be employed to discover topics (here, the dimensions of product quality expressed by the consumers) from the textual contents. Specifically, Latent Dirichlet Allocation (also popular in other disciplines as Topic Model, the model uncovering the topic of the discussion in a given text) may be used to extract the latent dimensions of quality and the associated valence, if any, discussed by consumers in their reviews. See Blei, D., Ng, A., & Jordan, M., 2003, "Latent dirichlet allocation," The Journal of Machine Learning Research, 3, 993-1022; Blei, D., & Lafferty, J., 2006, "Dynamic topic models," ACM, pp. 113-120; Grimmer, J., 2010, "A Bayesian hierarchical topic model for political texts: Measuring expressed agendas in Senate press releases," Political Analysis 18(1), 1-35.; Braun, M., & Bonfrer, A., 2011, "Scalable Inference of Customer Similarities from Interactions Data Using Dirichlet Processes," Marketing Science, 30(3), 513-531. This may be the first use of the method in marketing for dimension extraction.

—Intuition

Consumers choose words to express their opinion on one or more dimensions of quality that they experience and think worthy of sharing with others through their reviews. These dimensions of quality and their associated valence may be unobservable (latent) to the researcher. These dimensions of quality may be represented on a K dimensional vector space. Each review could be thought of as an output of these latent dimensions of quality that are represented with appropriate words chosen by consumers. So each word in the review may be generated by the consumer to reflect some dimension of quality. Since the words may be observed, the latent dimensions may be inferred from the statistical distribution of these words across all the reviews. Intuitively, words that are close in meaning may occur together in the reviews. So, observing these co-occurrences across all the review may help capture the latent dimension and its corresponding valence.

Latent Dirichlet Allocation may be used for this purpose. The model is a "generative model," as it may closely mimic the consumers' generating the reviews, based on their beliefs about the product's quality. Statistically, it may characterize the process that defines the joint probability distribution over both the observed data (words of the review) and the hidden random variables (the dimensions of quality) See Blei 2003 D. Blei, A. Ng, and M. Jordan, Latent Dirichlet allocation, *Journal of Machine Learning Research,* 3:993-1022, January 2003. The similarity between the dimensions may be found by calculating the distance between the positions of the words in the vector space.

—Specification

The dimension of quality may be defined to be a latent construct distributed over the words that consumers use to describe their experience with the product. Let K be the total number of dimensions expressed by the consumers across the D reviews of a brand in a given time period represented as $\{d_1, d_2 d_3 \ldots d_D\}$. An individual consumer might choose to discuss a subset of these K dimensions in the review by selecting appropriate words that best express the consumer's experiences with the brand.

The $k^{th}$ dimension's importance in the consumer's evaluation of the product may be determined by the proportion allocated to the discussion of that specific dimension represented by the parameter $\theta_k^d$. For each review, there may be a vector of parameters, $\theta^d = \{\theta_1^d, \theta_k^2 \ldots, \theta_k^d, \ldots, \theta_K\}$, corresponding to the K dimensions. $\theta_k^d$ represents the expected probability of dimension k occurring in review d. Since consumers may be constrained by the amount of space available to them, they may naturally tend to focus on those dimensions of quality that appear important from their experience of the product. For example, a consumer may devote about 40% of the discussion to the ease of use of a specific product, 30% to its stability, 15% to its compatibility and 15% to its reliability. Some or all of these dimensions might have a positive or a negative valence. The words may also be chosen such that they describe these dimensions and will have their own share of contribution to the dimensions they represent. Hence, deriving the distribution of these words helps in discovering the underlying dimensions and its importance.

The valence vector may be represented with $\pi$ and may follow a similar logic for its distributional assumptions, as previously discussed for the dimensions of the review. Associated with these dimensions may be a distribution for the valence associated with that dimension of discussion. Thus, in review d, the consumer may discuss some latent dimensions of the quality of the product, each represented by the index k, and the valence associated with the dimension may be represented using the index j. Each of these dimensions and associated valence may be characterized by a distribution of words represented by $\phi$.

FIG. 1 illustrates an example of the hierarchy of how parameters may relate words to dimensions and valence.

Figure 2:
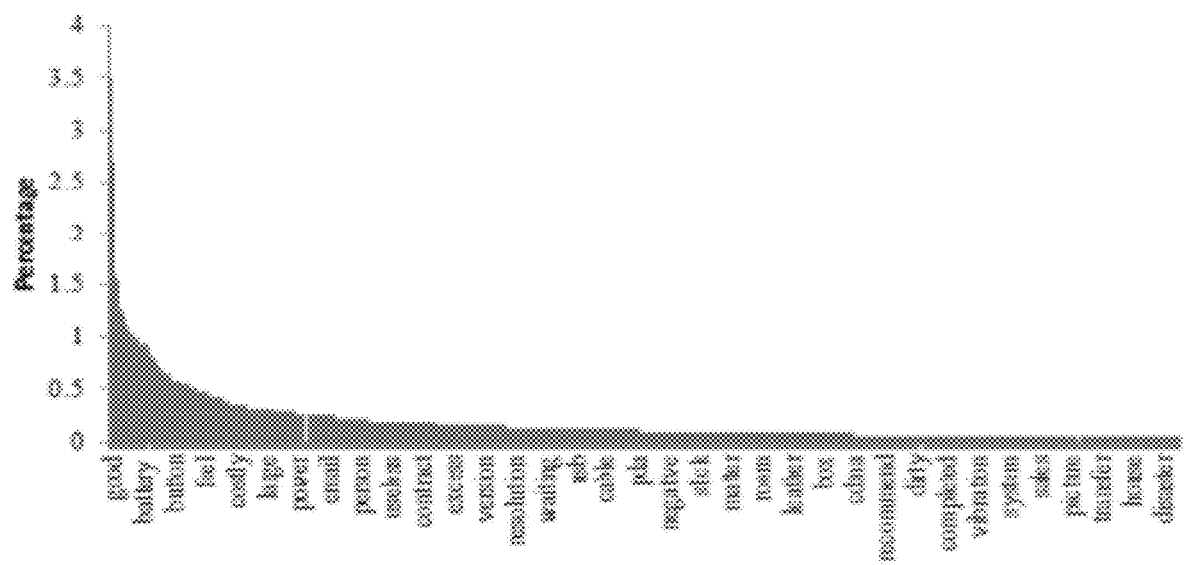
FIG. 2 illustrates the distribution of certain words for the cell phone market.

FIG. 2 illustrates the distribution of certain words for the cell phone market. The vertical axis represents the distribution of each of the words relative to all the words in the sample market.

—Estimation

The posterior distribution of the hidden dimensions conditional on the distribution of the observed words may be estimated. Blei et al. (Blei, D., Ng, A., & Jordan, M., 2003, "Latent dirichlet allocation," The Journal of Machine Learning Research, 3, 993-1022), may be followed for the computation of the posterior distribution. The set of words that are generalized to be positive or negative words may be used, irrespective of the dimension. The propagation of the valence across all the words may occur through the co-occurrence of the seed words in the reviews. Similar methods have been employed in prior studies (e.g., Jo, Y., & Oh, A., 2011, "Aspect and sentiment unification model for online review analysis," ACM: 815-824; Turney, P. and Littman, M., 2003, "Measuring praise and criticism: Inference of semantic orientation from association"). The entire estimation procedure may closely mimic a consumer writing the review. The dimensions of quality expressed in the reviews may be taken from a random draw with the occurrence of a specific dimension in the vector determined solely by the consumer's experience with the brand. Conditional upon this sampled dimension, a review's content may be drawn from a distribution that is specific to each dimension.

The contribution of the words in a sentence to the $k^{th}$ dimension across all the reviews may be represented by $z_i$. Similarly, the contribution of the words to the valence may be represented by $s_i$. If $w_{n,d}$ represents the n words in review d, the joint distribution of the variables may be represented as:

$$p(\phi_i, \theta_d, \pi_s, z_d, s_d, w_d) = \prod_{n=1}^{K} p(\phi_n) \prod_{n=1}^{D} p(\theta_d) \left( \prod_{n=1}^{D} p(z_{d,n} | \phi_n, \theta_d) p(w_{d,n} | \phi_{1:K}, \theta_{1:k}, z_{d,n}) \right) \quad (1)$$

To estimate this equation, the dimensions discussed in each sentence of a review may be drawn conditional on the dimensions ($\theta_k$) salient to a consumer's experience with a product. A dimension $z_k$ may then be randomly drawn assuming a multinomial distribution where, $z_i|\theta_i \sim \text{Multinomial} (\theta_d)$. It may be assumed that the attribute of each sentence follows a multinomial distribution such that, $s_j|\pi_i \sim \text{Multinomial} (\pi_d)$. Finally, the words of each sentence may be drawn assuming a multinomial distribution ($\phi_{jk}$), conditional on both the attributes ($z_i$) and associated valence ($s_j$).

A Dirichlet prior may be started with for the valence and dimension of quality ($\pi$ & $\theta$). Specifically, each of the dimensions and the corresponding valence may be assumed to be drawn from a Dirichlet distribution, $$\theta_{ds} \sim \text{Dirichlet}(\alpha), \pi_d \sim \text{Dirichlet}(\gamma)$$

Here, the γ and α may be the parameter priors of the Dirichlet distributions of the valence and dimensions respectively. The exact algorithm is described below in the section entitled "Predictive Validity with Daily Stock Returns."

For computing the posterior, a sampling based Bayesian estimation may be used (Griffiths, T., & Steyvers, M., 2004, "Finding scientific topics," Proceedings of the National Academy of Sciences of the United States of America, 101 (Suppl 1), 5228-5235). Gibb's sampling may be used for estimating the latent variables in the model (θ, π, and θ). The posterior may be estimated as the limiting distribution of the Markov Chain Monte Carlo (MCMC) procedure adopted for Gibbs sampling. The number of dimensions discovered by the method may be decided using the highest posterior likelihood calculated above. This value may keep increasing as information is extracted with more dimensions, but may decrease after a point due to a penalty for too many dimensions. To determine the optimal number of dimensions for a market, the process may begin by extracting two dimensions initially and then gradually increase the number of dimensions until the log-likelihood reaches a maximum. For the different models with varying dimensions, the MCMC chain was sampled at every $100^{th}$ iteration after the log-likelihood value stabilized (Griffiths, T., & Steyvers, M., 2004, "Finding scientific topics," Proceedings of the National Academy of Sciences of the United States of America, 101(Suppl 1), 5228-5235).

The importance of the dimensions was measured by the frequency of occurrence of these dimensions in any given time period.

Dimension Labeling

This section describes the labeling in four stages: challenges, intuition, specification, and estimation.

—Challenges

After estimating the model and extracting the dimensions, two tasks are performed. The first is selecting the words that might better distinguish the reviews associated with that dimension. This may ensure identification of the words that are common across all the reviews that have the dimension expressed in it. Conversely, these words have to be occurring sparsely in the documents that did not evaluate this dimension. This criterion may be important given that the underlying logic of the method outlined above may be dependent on the frequency of occurrence of the words in reviews. Words such as product names, model or physical attributes may not be used in discovering the dimension labels, even if they are extracted within some dimension. The second task is to assign a label to the given dimension such that it reflects the topic of discussion that is evaluated across all the reviews identified with the dimension. These two tasks may be interrelated, as the words that are important for a given dimension may determine its label, and to gauge the importance of the dimension, words that encompass the dimension are ranked.

—Intuition

To resolve these two challenges, a score is derived for the word set under a dimension that is based on the "mutual information" between the given dimension and the word. The mutual information measures the quantum of information gained by the given dimension due to the presence of the word under that dimension. In other words, a term with high mutual information has a greater contribution to the dimension and thus can reduce the information derived from the rest of the words that factor into the dimension. For this, the entropy of the dimension may be calculated similar to the approach of MacKay (MacKay, D., 2003, Information theory, inference, and learning algorithms. Cambridge Univ Press) and Grimmer (Grimmer, J., 2010, "A Bayesian hierarchical topic model for political texts: Measuring expressed agendas in Senate press releases," Political Analysis, 18(1), 1-35). Entropy measures the probability that a randomly chosen sentence, belonging to the set of reviews of a brand, was generated by dimension k (Manning, C., Schutze, H., & MITCogNet, 1999 Foundations of statistical natural language processing, Vol. 59, MIT Press; and Manning, C., Raghavan, P., Schutze, H., & Corporation, E., 2008). Entropy measures have been used in assessing model fit and examining the separation between consumer segments (e.g., DeSarbo, W., Wedel, M., Vriens, M., & Ramaswamy, V., 1992, "Latent class metric conjoint analysis," Marketing Letters, 3(3), 273-288; Kamakura, W., Kim, B., & Lee, J., 1996, "Modeling preference and structural heterogeneity in consumer choice," Marketing Science, 152-172).

—Specification

Entropy may be defined as:

$$\text{Entopy}(k) = -\sum_{l=0}^{1} P(\eta = l) \log_2 P(\eta = l) \tag{2}$$

Here, E(k) refers to the entropy score of the given dimension generated by the sentence, and η is an indictor variable that refers to the given dimension generated by the review (MacKay, D., 2003, Information theory, inference, and learning algorithms. Cambridge Univ Press). The entropy may measure the uncertainty about the dimension generating the review. If all the reviews could be assigned to the same dimension, then the (E(k) has the minimum value; if all the reviews contribute evenly across all the dimensions, then it has a maximum value. If a chosen word w appears in a review (ψ=1), then the entropy of the dimension may be modeled conditional upon that word as:

$$\text{Entropy}(k \mid w) = -\sum_{l=0}^{1} \sum_{w^*=0}^{1} p(\eta = l \mid w = w^*) \log_2 P(\eta = l \mid w = w^*) \tag{3}$$

—Estimation

The Mutual Information (MI) gained for a dimension k due to word w may be the difference between (1) and (2). If a word w provides information to the given dimension, then $$MI(k/w) = \text{Entropy}(k) - \text{Entropy}(k \mid w) \geq 0 \forall (k, w) \tag{4}$$

If a word provides no information about the topic, then the MI is zero. The higher the information contributions of the word to the dimension, the higher the MI score. The top ranked words may then be selected such that they cover 80% of the reviews that could be identified with the given dimension. Hence, the words with the higher MI could be selected as spanning the given dimension. The words with the highest MI with each dimension could provide possible labels for the given dimension.

Results

This section first summarizes the results of the extraction of the dimensions of quality. It then discusses the validation of these dimensions using multiple methods described above. Finally, it describes the face, external, and predictive validity of the extracted dimensions.

—Dimensions of Quality

The Latent Dirichlet Allocation may be applied for extracting and labeling the dimensions of quality and the valence of dimensions across all the reviews belonging to each of the fifteen firms in the sample. The results of the dimensions extracted may be illustrated using snapshots of the brands at given time period.

FIG. 3 illustrates an example of the dimensions extracted for Motorola in the cell phone market, during the November, 2008. FIG. 3 shows that the top 6 dimensions are Performance, Stability, Ease of Use, Compatibility, and Secondary Features.

For each dimension, the words relating to that dimension are listed below it. The words listed under each dimension are those with the highest mutual information score (calculated by Equation 3). These words help explain the characteristics represented by that dimension and could help label that dimension. For example, the first column of FIG. 3 shows the terms relating to the second dimension. Of these terms, the word with the highest Mutual Information Score is "unstable". Thus, "Instability" could be an appropriate label for this dimension. Following a similar logic the second column characterizes "portability" because it represents words expressing the portable nature of the cell phone (—slim, handy, portable).

FIGS. 4A-4E illustrate examples of extracted dimensions during the fourth quarter of 2008 for various markets, specifically for cell phones (FIG. 4A), computers (FIG. 4B), data storage (FIG. 4C), toys (FIG. 4D), and footwear (FIG. 4E).

A disadvantage of this method may be that, for some dimensions, the automatic labeling by the mutual information score may not convey the meaning in its entirety. Manual labeling of the dimensions through human intervention might be possible. For each of the dimensions extracted, 10 reviews were randomly selected that have high posterior probability (from the LDA model) for the dimension. A deeper analysis of the reviews may not only help in understanding the issue with the specific dimension of quality, but may also shed more insight into the cause or nature of the associated dimension of quality. For example, all the words in the last column of FIG. 4 may pertain to some secondary features (applications, additional memory card slot, camera, Wi-Fi) of the phone that were of significance to consumer experience and hence the high frequency of mention of these words across all the reviews.

Some of the dimensions that emerge may pertain to issues relating to the retailer and not the manufacturer of the product or the brand discussed. These issues may not be considered as dimensions of product quality, as they do not inherently characterize the product (or the brand).

The labels derived from the Mutual Information score may be reliable and may identify the important dimensions discussed by consumers in the reviews. The valence associated with the various dimensions is within parentheses in FIG. 4. A positive valence associated with a dimension represents those characteristics of the brand that are liked by the consumer, while a negative valence represents those characteristics that are not liked by the consumers. For example, words such as heavy, big, cramp, finger (refers to the fingering of keys), and layout are high in the mutual information score and load on negative valence. This loading could imply that consumers do not perceive the brand high on the "layout" dimension. On the other hand, the word stems "smooth," "handy," "multi-touch," and "portable" express positive sentiments about portability.

The Latent Dirichlet Allocation procedure may cluster words contextually as the model determines the valence depending on the context in which the words co-locate. For example, the word "large" has a positive valence in the context of the size of the memory or the screen of a cell phone. But the same word has a negative valence in the context of the overall size of the cell phone. This advantage of the Latent Dirichlet Allocation ensures that category specific meanings of words may be captured simultaneously with the analysis, without the need for developing a category specific dictionary prior to performing the analysis.

FIG. 3 shows the results for one brand and time period. Analogous results have been obtained for other categories and time periods, including those found in FIGS. 4A-4E.

Figure 5A:
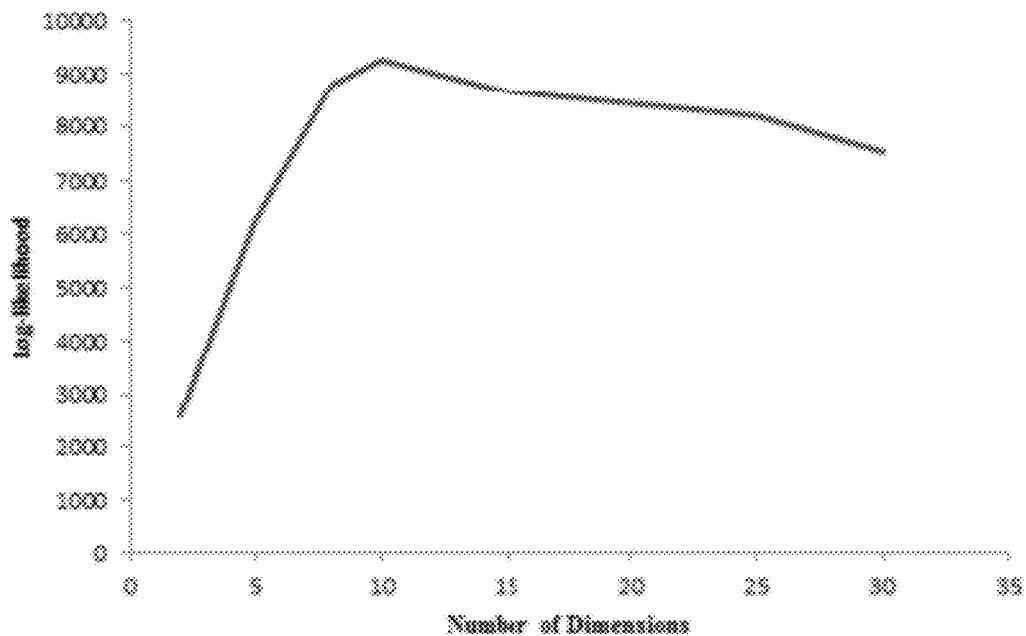
FIGS. 5A and 5B illustrate examples of curves for the log-likelihood as a function of dimensions for the cell phone and computer markets, respectively.
Figure 5B:
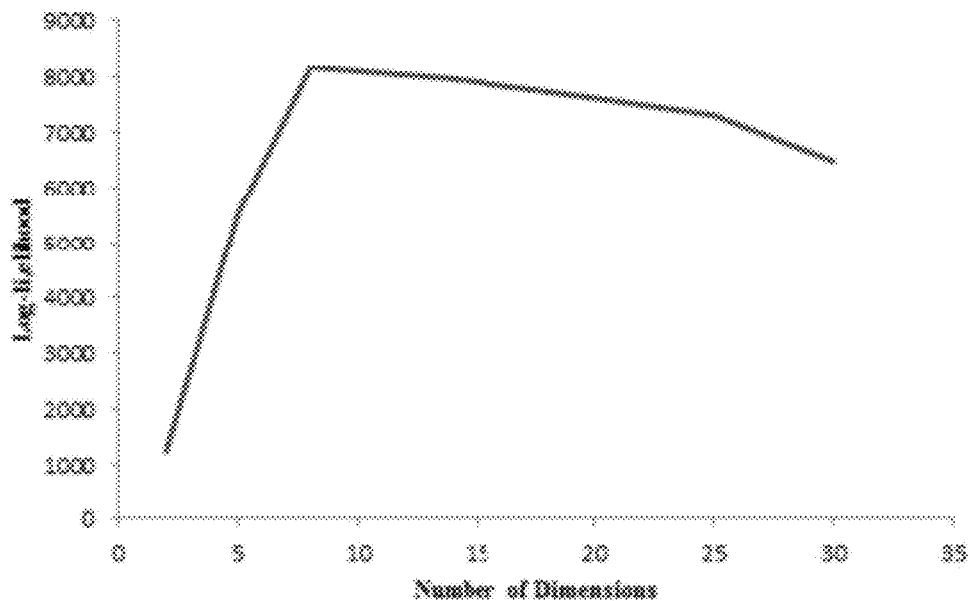

To estimate the optimal number of dimensions, the posterior likelihood distribution was sampled for varying numbers of dimensions as explained in the section entitled "Method." FIGS. 5A and 5B illustrate examples of curves for the log-likelihood as a function of dimensions for the cell phone and computer markets, respectively. In these markets, the log-likelihood may reach a maximum value around 10 dimensions.

Brand Mapping

This section illustrates an application that uses the results of the LDA model for deriving perceptual maps of the brands in the market for computers. Brand mapping may consist of graphing the position of competing brands in a market based on their location in space defined by the key dimensions (e.g., DeSarbo, W., Grewal, R., & Scott, C., 2008, "A clusterwise bilinear multidimensional scaling methodology for simultaneous segmentation and positioning analyses," Journal of Marketing Research, 45(3), 280-292).

The position of the brands on a brand space may be found by mapping the distance between the brands on a given dimension. The distance between two brands, say 'a' and 'b', may be given by distance$_{a,b}$=$f(\theta_k^a, \theta_k^b)$, where the function $f(\ )$ calculates the Hellinger's distance (Rao, C., 1995, "Use of Hellinger distance in graphical displays," Multivariate statistics and matrices in statistics. Leiden, Netherlands: Brill Academic Publishers, 143-161) between the probability distributions of the words with the highest Mutual Information underlying the dimensions ($\theta_k$) across all the reviews of the two brands (a, b). Hellinger's Distance measure may be used, as it may be superior to some of the traditional techniques (e.g., correspondence analysis) for measuring the distance between probability distributions (Cuadras, C., Cuadras, D., & Greenacre, M. (2006). A comparison of methods for analyzing contingency tables. Communications in Statistics—Simulation and Computation, 35, 447-459; Cuadras, C., Cuadras, D., & Greenacre, M., 2006, "A comparison of methods for analyzing contingency tables," Communications in Statistics—Simulation and Computation, 35, 447-459). Divergence measures such as Kullback-Liebler (KL) statistic may not be used due to the aim of deriving a metric distance measure that can be easily used to calculate the perceptual maps. Also, the Hellinger distance may be more tractable in terms of computational efficiency than KL distance.

Hellinger's distance may have the following functional form:

$$f(\theta_k^a, \theta_k^b) = 2 \int dx \left( \sqrt{\theta_k^a} - \sqrt{\theta_k^b} \right)^2 \tag{7}$$

Hellinger's distance between the probability distribution of two brands on any given dimension may be calculated as:

$$E[f(\theta_k^a, \theta_k^b)] = E\left[\sum_k \left(\sqrt{\theta_k^a} - \sqrt{\theta_k^b}\right)^2\right] \quad (8)$$

The Hellinger distance for all combinations of brands within a given market may be measured to derive the similarity matrix of the brands. For example, if there are three brands, the similarity matrix between the three brands may be derived by calculating the six ($C(_2^3)$) combinations. Hellinger's distance may be a metric and symmetric measure of the distance among brands in multidimensional space. The similarity matrices of brands derived above may be used to map the positions of the brands using commonly available multivariate techniques such as Multidimensional Scaling (MDS) (Rao, C., 1995, "Use of Hellinger distance in graphical displays," Multivariate statistics and matrices in statistics. Leiden, Netherlands: Brill Academic Publishers, 143-161; DeSarbo, W., Young, M., & Rangaswamy, A., 1997, "A parametric multidimensional unfolding procedure for incomplete nonmetric preference/choice set data in marketing research," Journal of Marketing Research, 34(4), 499-516).

Two types of mapping are now described: static and dynamic.

Static Brand Mapping

Figure 6A:
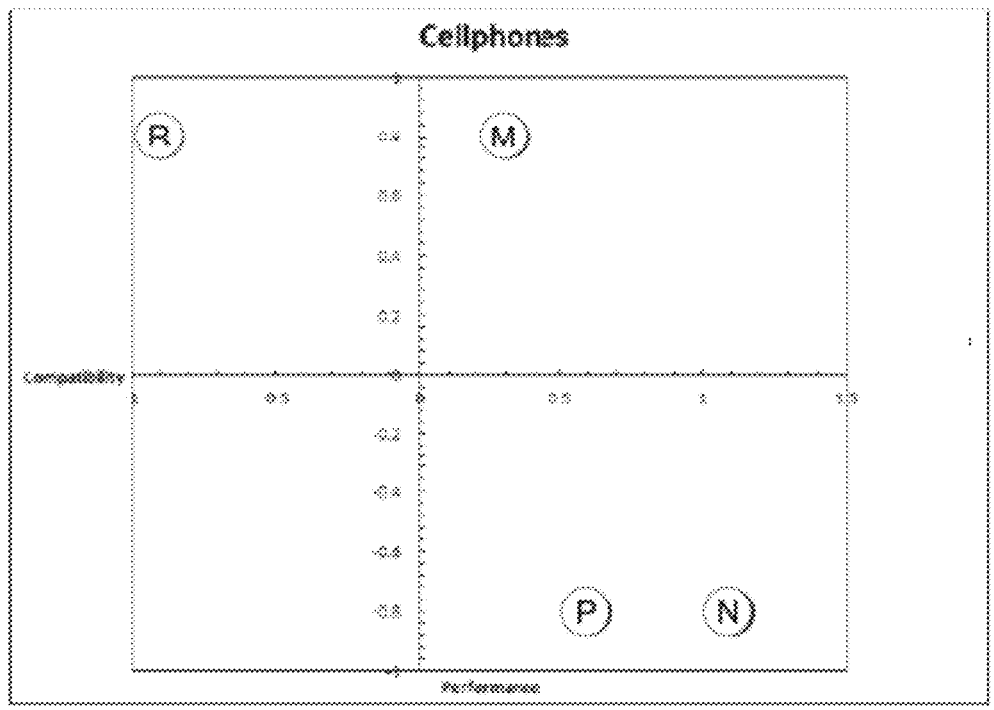
FIGS. 6A and 6B illustrate examples of perceptual maps for two markets, specifically cell phones (FIG. 6A) and toys (FIG. 6B), in Quarter 4 (October to December) of 2008.
Figure 6B:
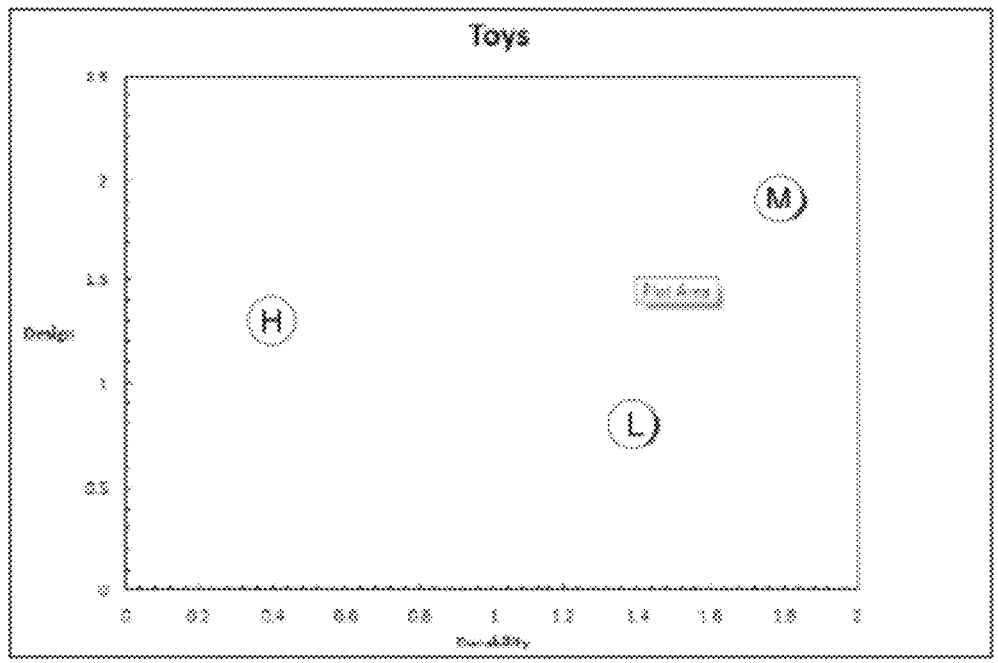

The static brand map may consists of carrying out the above procedure for brands on the top dimensions for a fixed period of time. FIGS. 6A and 6B illustrate examples of perceptual maps for two markets, specifically cell phones (FIG. 6A) and toys (FIG. 6B), in Quarter 4 (October to December) of 2008. For the purpose of illustration, the top two dimensions were chosen based on the importance of these dimensions as determined by the frequency of occurrence of these dimensions across all the reviews in the given time period for these markets. FIG. 6A shows that the brands Motorola and Blackberry (under Research in Motion) appear better than Palm and Nokia on the dimensions of Compatibility and Performance. In the case of toys (FIG. 6B), Mattel seems to outperform Leapfrog and Hasbro both in terms of Durability and Design dimensions.

Dynamic Brand Mapping

This section describes examples of how to capture dynamics of the dimensions. To capture the dynamics of the dimensions, the analysis was rerun on each weekly period (between June 2005 and December 2010) using the priors derived from the static analysis. Specifically, the probability was extracted that each of the dimensions occurred in a given week. The estimated probability that a dimension z occurred in the review d in time period t may be defined as:

$$\hat{p}(z \mid t = \tau) = \sum_{(d \mid t_d = \tau)} \hat{p}(z \mid d)\hat{p}(d \mid t = \tau) \quad (9)$$

Figure 7:
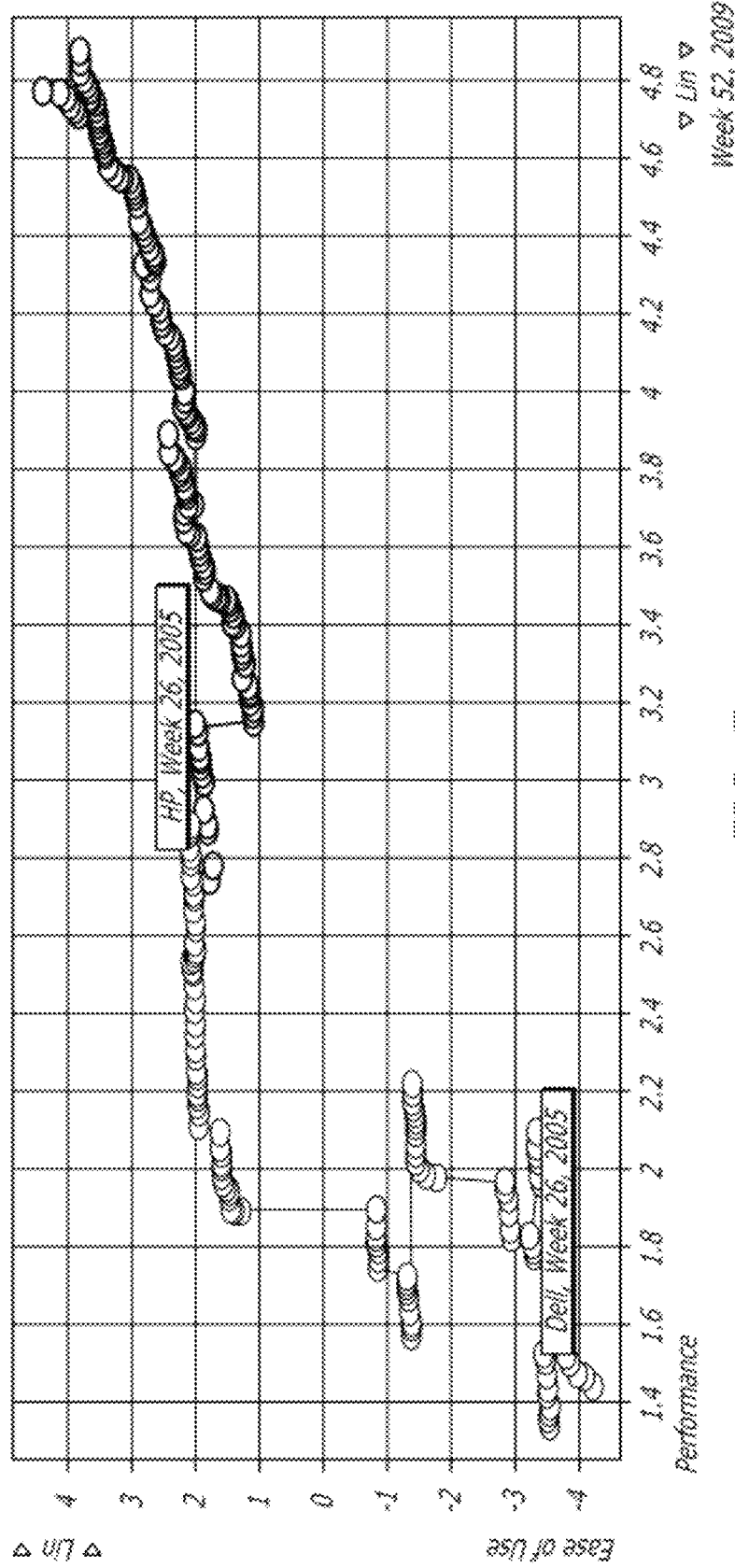
FIG. 7 illustrates an example of a graph that traces the evolution of the brand position of Dell (the first part of X axis) and Hewlett-Packard (the second part of the X axis) during a sample period (June 2005 through December 2009) on a weekly basis.

This may be illustrated in the computer market. FIG. 7 illustrates an example of a graph that traces the evolution of the brand position of Dell (the black points) and Hewlett-Packard (the lighter points) during a sample period (June 2005 through December 2009) on a weekly basis. The two axes correspond to the scaled probability mass of the brands measured for the dimensions of Ease of Use and Performance. These dimensions emerge as the most frequently discussed dimensions in these markets during the time period. Both these brands are evaluated along these dimensions over the time period and the positions are depicted in the latent space corresponding to these two dimensions.

As can be observed from the charts in FIG. 7, Dell's position on Ease of Use is more unstable and changes rapidly over the time period. This may indicate that consumer opinion on the ease of use dimension of Dell is relatively volatile. Compared to this, HP's evolution is more stable along these two dimensions in the same time period. This is in line with expectations. Around early to mid-2005, Dell was prominent in the news for bad product performance and customer service. An example is the popular blog by Jeff Jarvis on the poor customer service and product quality of Dell. Dell's subsequent response was opening the Dell Direct online forums to improve the customer interface and service and its initiatives to improve product quality. The increase in positive opinion about Dell in online reviews regarding its ease of use and performance is visible in the chart as of Week 3, 2007.

Dynamics of Dimensions

The dimensions of quality may vary over time. In most markets, the brand trajectories on the dimensions of quality may evolve smoothly over a period of time; while in others there may be turbulence in certain time periods, as reflected by the transient spurts and falls of brands along these dimensions. (These spikes in the position of the brands may preclude employing techniques such as the Dynamic Topic Model (Blei, D., & Lafferty, J., 2006, "Dynamic topic models," ACM, pp. 113-120), as they may penalize large transient changes occurring over time.) This can be partially attributed to reasons such as product launches in the same category, failures in launch of some models of the product, or introduction of competing products. This may be illustrated using the cell phone market.

Figure 8A:
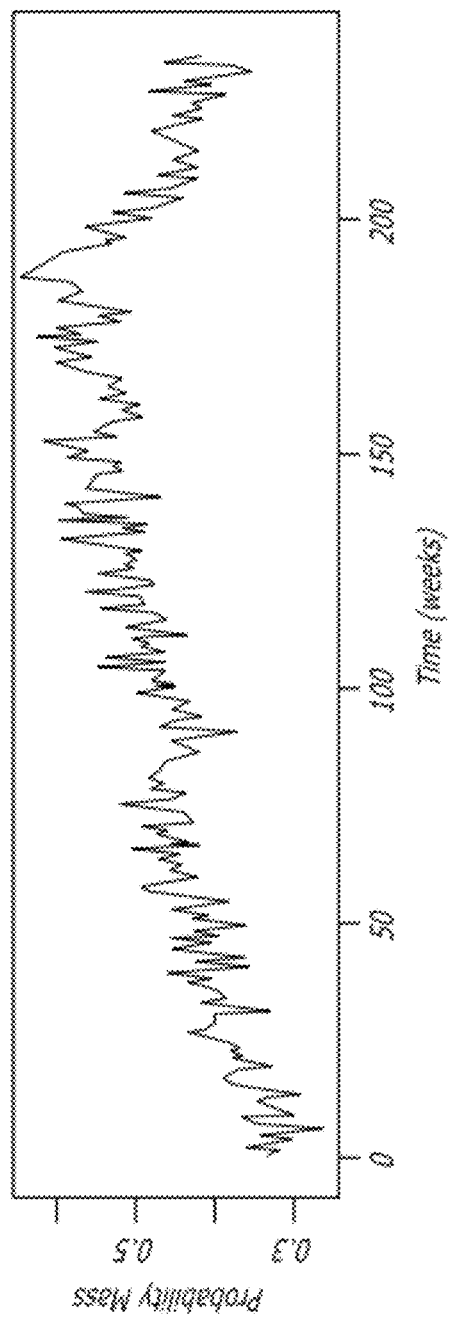
FIGS. 8A and 8B illustrate an example of the evolution of the dimension of "ease of use" in the cell phone market.
Figure 8B:
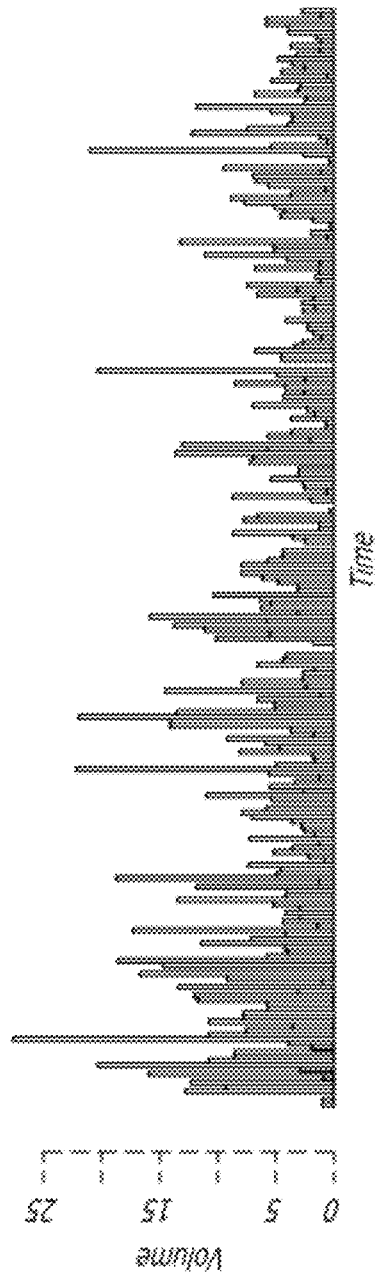

FIGS. 8A and 8B illustrate an example of the evolution of the dimension of "ease of use" in the cell phone market. FIG. 8A illustrates the probability mass associated with the dimension. FIG. 8B illustrates the frequency of occurrence of the dimension across the reviews in a given week. For ease of visualization, the probability mass of the dimension is shown as estimated for the cell phone market Blackberry (brand of Research in Motion) from Equation 11, along with the volume of reviews containing the mentions of the given dimension at the bottom of the panel. These values increase over the time period until mid-2008, and then gradually decline over time. Some of the trends and transient spikes can be associated with the launch of new products. For example, for the increasing trend from week 150 can be attributed to the release of the Blackberry Storm (released in December of 2008). The opposite effect occurs when strong competitive products are introduced. This effect is evident in the decline of the Blackberry brand on the "Ease of Use" dimension around week 180. This result could partially be attributed to the increasing penetration of the iPhone in the smartphone market causing increasing expectations of Ease of Use of the Blackberry phones. In this case, the trajectory of the dimensions of quality of a brand seems to be related to entry and exit of other brands in the market. These trends may be attributed to the innovation in the underlying technologies. In the smartphone market, radical technological advances in these areas (e.g., touch based screens, voice recognition) may influence the consumer perceptions of the product. Interestingly, these changes are also associated with increase in the volume of discussion of these dimensions around the same time period (as seen in FIG. 8B). Similar results were found in other markets too.

Discussion of Findings

A few dimensions of quality may be salient for the brands in each market at any time. These dimensions may differ across various brands in a given market and across markets.

FIG. 9 illustrates percentages of agreement between automated analysis and human raters for the cell phone, computer, data storage, toys, and footwear markets.

The valence associated with the dimensions may vary across markets.

FIG. 10A-C illustrate comparisons between the automated method of analysis discussed above and results in Consumer Reports for the cell phone market (FIG. 10A), computer market (FIG. 10B), and footwear market (FIG. 10C). These dimensions may exhibit face validity with respect to dimensions extracted by independent human raters and external validity with respect to dimensions reported in Consumer Reports.

These dimensions may exhibit good predictive validity with respect to measures of financial performance. The valence associated with the dimensions may also have a significant effect on the financial performance of these dimensions.

FIG. 11 illustrates degree of overlap of the set of dimensions by Consumer Reports and automated analysis.

FIG. 12 illustrates a mean rank order correlation between Consumer Reports ratings and automated analysis across the firms in the markets.

Brand's position on dimensions may be captured by multidimensional scaling. The position of the brands along these dimensions may change over time. Dimensions may change importance over time as indicated by their occurrence in reviews.

Predictive Validity with Quarterly Earnings

Figure 13:
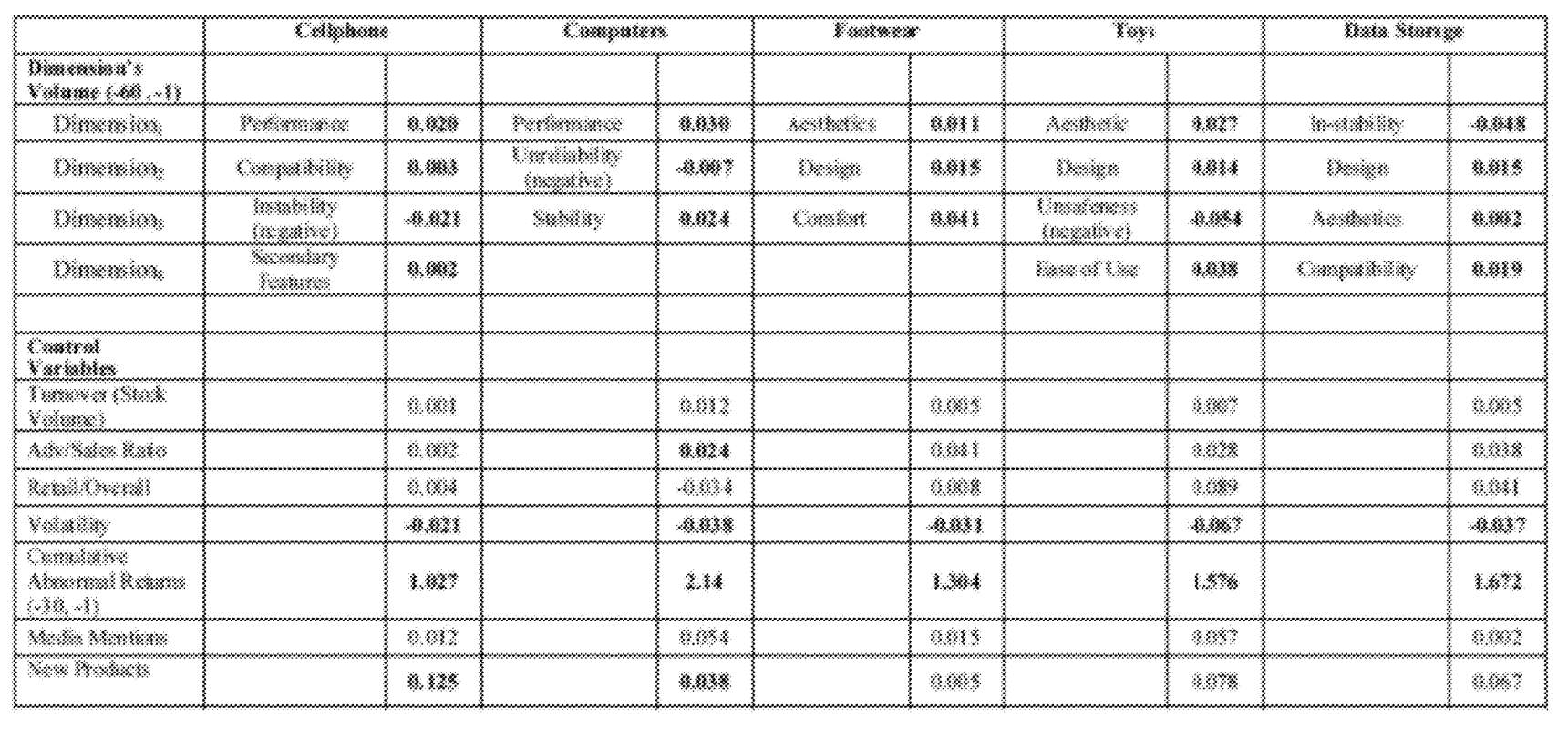

FIG. 13 illustrates prediction of stock earnings using the dimensions of quality (standardized unexpected earnings regressed on the dimensions and control variables). The results shown include only the dimensions that have significant value in a given market and the standard errors are clustered by the firm. Where the dimension has a negative connotation, it is indicated within a parenthetical.

To assess the predictive ability of the dimensions on the quarterly earnings of a firm, the top ten dimensions may be first extracted across the entire time period in the sample using automated analysis. Then, the importance of these dimensions may be determined in each time period using the total number of times a specific dimension occurs in the reviews of a given firm in the given time period—Dimension$_{ik}$ (k is the specific dimension and i is the firm index). The positive dimensions and negative dimensions may be considered separately to assess the difference in impact due to the valence of the dimension. The quarterly earnings surprise may be used as the financial outcome measure. Following Livnat and Mendenhall (2006) [Livnat, J. & Mendenhall, R. (2006), "Comparing the post-earnings announcement drift for surprises calculated from analyst and time series forecasts," *Journal of Accounting Research*, 44(1), 177-205, each firm's standardized unexpected earnings (SUE) may be computed as the unexpected earnings (UE$_{it}$) on the day of earnings announcement scaled by the price of the share P$_{i,q-4}$. The unexpected earning may be calculated as the difference between the earnings per share in the given quarter (EPS$_{i,q}$) and expected analyst earnings (EPS$_{analyst}$), calculated as the median of the analyst's forecasts as reported by I/B/E/S database in the 90 days prior to the earnings announcement.

$$SUE_{i,q} = \frac{UE_{i,q}}{P_{i,q}} \text{ where } UE_{i,q} = EPS_{i,q} - EPS_{analyst} \quad (5)$$

To test the relation between the earnings and the dimensions, the SUE of the firm may be regressed on the different dimensions in each market, thus:

$$SUE_{it} = \Sigma_{k=1}^{10} \beta_k Dimension_{kit} + \beta_6 Turnover_{it} + \beta_7 CAR_{-30,-1it} + \beta_8 AdSales_{it} + \beta_9 Volatility_{it} + \beta_{10} Investor_{it} + \beta_{11} Media_{it} + \beta_{13} NewProducts_{it} + \epsilon_{it} \quad (6)$$

The regression may include control variables for the other financial variables that could influence the earnings, such as the abnormal turnover in terms of the volume of shares traded in the stock exchange, the CAR (Cumulative Abnormal Returns, CAR [−30,1]) for the preceding 30 days, and volatility of the firm's stock price. The CAR [−30,−1] may be calculated from the benchmark Fama French Three Factor model (with momentum included) prior to the day the volume of the dimensions is observed. This has been used in prior studies (e.g., Tetlock, P., Saar-Tsechansky, M., & Macskassy, S., 2008, "More than words: quantifying language to measure firms' fundamentals," The Journal of Finance, 63(3), 1437-1467) to compare the ability of the variable of interest (here the dimensions of quality) and the firm's recent stock market returns to predict future earnings of the firm. Both variables are known to capture potential firm-specific information over the same time horizon. By including both these variables, it may be possible to test if there is information in the dimensions beyond the historical abnormal stock returns. Other control variables included in the model may be the advertising to sales ratio in the quarter (from Compustat database), the total number of media mentions about the firm as collected (from Lexis Nexis database), and the dummies for any new products introduced immediately with a five day window before and after the earnings announcement (Lexis Nexis database).

Predictive Validity with Daily Stock Returns

FIG. 14 illustrates prediction of the stock performance using the dimensions of quality. The values may represent the performance of the portfolio. Where a dimension has a negative connotation, the coefficient is negative.

Overall product quality information may have informational value that is not already discounted by the investors in the stock prices. This concept may be extended by analyzing the relative importance of the dimensions of quality in influencing stock market performance. To do so, whether the dimensions discovered in the automated analysis have any informational value to the investors may be tested by relating them to the abnormal stock returns of the firm using the Calendar Time Portfolio method (Mitchell, M., & Stafford, E., 2000, "Managerial decisions and long-term stock price performance," Journal of Business, 287-329). The tests may be performed at a disaggregate level using the daily stock returns. The benefit of disaggregate data may be that it is closer to real time and can be of practical use to managers to get feedback on the positioning of the brands. Specifically, whether there is unanticipated information in the dimensions of quality that could predict the stock returns at a daily level may be tested.

To perform the portfolio analysis, portfolios may be constructed based on the dimensions extracted. Similar to the prior analysis, a volume may be derived based on daily metrics of perceived quality. To do so, first Volume$_{kit}$, the total volume of reviews that are tagged with the specific dimension in the given time period (here, daily) may be measured. Because the discussion associated with dimensions varies over time, the incremental information about dimensions may be captured on each day by measuring the change in volume of the reviews. To do so, ΔVolume$_{kit}$ may be defined as the change in volume of the reviews of a brand on a given dimension over the median volume of reviews in the prior ten days, thus:

$$\Delta Volume_{kit} = Volume_{kit} - Median(Volume_{kit-1}, Volume_{kit-2}, \ldots Volume_{kit-10}) \qquad (10)$$

The change over the median may be used in order to account for sudden spurts in the volume of the reviews. If the daily variation in the volume is greater than the moving average of $\Delta Volume_{kit}$ for a given brand in a given day, the firm may be assigned for the given day into the portfolio with the label of that dimension.

For example, if the $\Delta Volume_{kit}$ of the "performance" exceeds ($Volume_{kit}$−MovingAvg($\Delta Volume_{kit}$)) on a given day, it may be assigned to the "performance" portfolio. Firms may be included or excluded continuously over the sample period of 1112 trading days. The procedure may be repeated and portfolios constructed for the top ten dimensions in each market during the entire period of study. Then an investigation may be conducted to determine whether it is profitable to base the investment strategy by calculating the abnormal returns on these portfolios using the intercept (alpha) of the Fama French Three Factor model and the Carhart momentum factor regression.

$$R_{i,t} - R_{f,t} = \alpha_i + \beta_{i,MKT}(R_{MKT,t} - R_{f,t}) + \beta_{i,SMB}SMB_t + \beta_{i,HML}HML_t + \beta_{i,MOM}MOM_t + e_{i,t}, e \sim N(0,\sigma^2) \qquad (11)$$

The various data processing approaches that have been described above may be implemented with a computer data processing system that stores the data to be processed and/or that has access to this data. The computer data processing system may include one or desktop computers, Internet servers, portable computers, other types of computers, or a combination of these. When multiple computers are used, they may be at the same or different locations. When at different locations, the computers may be configured to communicate with one another through a wired and/or wireless network communication system.

Each computer includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer may include software (e.g., one or more operating systems, device drivers, application programs, and/or communication programs). When software is included, the software includes programming instructions and may include associated data and libraries. When included, the programming instructions are configured to implement one or more algorithms that implement one or more of the methods or techniques that are described above. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The results of the various computations and data processing that have been descried may be outputted to any type of output device, such as a display or printer. The results may in addition or instead be transmitted to another system, such as another computer system.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the techniques that have been described may be applied to ascertaining quality perceptions about companies or business in general.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A non-transitory, tangible, computer-readable storage medium containing a program of instructions configured to cause a computer system running the program of instructions to create a brand map by performing the following:
   converting online user-generated content concerning various brands of a product or service into structured data that has a structured format that is appropriate for machine analysis;
   performing a statistical analysis on the structured data that yields statistics about the quality of the product or service;
   deriving multiple dimensions concerning the quality of the product or service from the statistics;
   labeling the dimensions with entropy statistics; and
   generating a brand map of the relative positions of the brands in a market for the product or service based on the statistics and the multiple dimensions.

2. The medium of claim 1 wherein the user-generated content is in the form of comments about the product or service in unstructured text.

3. The medium of claim 2 wherein the unstructured text includes consumer reviews of the product or service.

4. The medium of claim 1 wherein the statistical analysis includes dimension reduction.

5. The medium of claim 4 wherein the dimension reduction includes a latent Dirichlet allocation.

6. The medium of claim 4 wherein the dimension reduction includes a principle component analysis.

7. The medium of claim 1 wherein one or a combination of the statistics represent a dimension of quality concerning the product or service.

8. The medium of claim 1 wherein the user-generated content includes reviews of the product or service and wherein at least one of the dimensions includes a characteristic of the product or service that is hidden or latent in a plurality of the reviews.

9. The medium of claim 1 wherein at least one of the dimensions concerns a characteristic of the product or service.

10. The medium of claim 9 wherein the characteristic is the reliability of the product or service.

11. The medium of claim 9 wherein the characteristic is the durability of the product or service.

12. The medium of claim 9 wherein the characteristic is the ease of use of the product or service.

13. The medium of claim 1 wherein at least one of the dimensions is associated with a valence that is positive or negative.

14. The medium of claim 1 wherein the brand map sets forth positions of the brands on a latent space as perceived by customers.

15. The medium of claim 14 wherein the positions of the brands on the brand map are relative to each other depending on the evaluation of the brands by customers.

16. The medium of claim 1 wherein the program of instructions is configured to also cause the computer system running the program of instructions to use the brand map to predict stock market performance of a company associated with one of the brands.

17. The medium of claim 1 wherein the program of instructions is configured to also cause the computer system running the program of instructions to get feedback from customers about the product or service.

18. The medium of claim 1 wherein the program of instructions is configured to also cause the computer system running the program of instructions to determine changes to the dimensions as a function of time.

19. The medium of claim 17 wherein the program of instructions is configured to also cause the computer system running the program of instructions to determine changes to the brand map as a function of time.

* * * * *